United States Patent [19]

Hughes

[11] Patent Number: 5,084,882
[45] Date of Patent: Jan. 28, 1992

[54] FACE PUMPED, LOOPED FIBRE BUNDLE, PHASED ARRAY LASER OSCILLATOR

[75] Inventor: John L. Hughes, Victoria, Australia

[73] Assignee: Phased Array Lasers Pty Ltd., Victoria, Australia

[21] Appl. No.: 490,680

[22] PCT Filed: Jul. 4, 1989

[86] PCT No.: PCT/AU89/00285
§ 371 Date: Mar. 9, 1990
§ 102(e) Date: Mar. 9, 1990

[87] PCT Pub. No.: WO90/00320
PCT Pub. Date: Jan. 11, 1990

[30] Foreign Application Priority Data

Jul. 4, 1988 [AU] Australia ............... PI9133

[51] Int. Cl.⁵ ............................................. H01S 3/30
[52] U.S. Cl. ............................................. 372/6; 372/66; 372/75; 359/333
[58] Field of Search ............ 372/6, 66, 75, 92, 71; 330/4.3; 350/96.15

[56] References Cited

U.S. PATENT DOCUMENTS 3,471,215 10/1979 Smitzer ................................ 372/6
4,682,335 7/1987 Hughes ................................ 372/6

FOREIGN PATENT DOCUMENTS 0080921 3/1989 Japan ................................. 372/6

Primary Examiner—James W. Davie
Attorney, Agent, or Firm—Dvorak and Traub

[57] ABSTRACT

This invention relates to a phased-array laser oscillator/amplifier system consisting of looped fibre lasers whose two optically polished end faces are stacked together to form a single output aperture near to which is positioned a single laser mirror in the case of the laser oscillator configuration of the invention or an optical window in the case of the laser amplifier configuration, which is index-matched to said output aperture, the said fibre bundle laser medium being optically excited via the said single aperture composed of the fibre ends. In the case of the laser oscillator configurations of the invention, the single laser mirror is partially transmitting and allows the output laser beam to emerge as a phase-locked beam formed by adding together all the outputs from the individual fibre laser ends. In the amplifier configuration of the invention, the input beam to be amplified passes into the said amplifier as a polarized beam via an optical window which is antireflection coated on its outside surface and index-matched to the aperture of the invention from the other side. The invention has application as scaleable laser beam generator in the industrial, medical and defence fields.

9 Claims, 3 Drawing Sheets

FACE PUMPED, LOOPED FIBRE BUNDLE, PHASED ARRAY LASER OSCILLATOR

FIELD OF THE INVENTION

This invention relates to a phased-array laser oscillator/amplifier system consisting of looped fibre whose two optically polished end faces are stacked together to form a single output aperture near to which is positioned a single laser mirror in the case of the laser oscillator configuration of the invention or an optical window in the case of the laser amplifier configuration, which is index matched to said output aperture, the said fibre bundle laser medium being optically excited via the said single aperture composed of the fibre ends. In the case of the laser oscillator configurations of the invention, the single laser mirror is partially transmitting and allows the output laser beam to emerge as a phase-locked beam formed by adding together all the outputs from the individual fibre laser ends. In the amplifier configuration of the invention, the input beam to be amplified passes into the said amplifier as a polarized beam via an optical window which is anti-reflection coated on its outside surface and index-matched to the output aperture of the invention from the other side.

The invention has application as a scaleable laser beam generator in the industrial, medical and defence fields.

SUMMARY OF THE PRIOR ART

Prior art, fibre bundle based, phased-array lasers consisted of doped optical fibre laser oscillators stacked together so that each of the said fibre laser oscillators were excited along the whole, or a portion of their length with the excitation light being coupled into the fibre along part of its length via optical coupling devices as known in the art or simply by direct, side excitation of said prior art lasers.

It was not possible to efficiently excite such prior art phased-array, fibre bundle based lasers via their output apertures because the cross-section area of the doped fibre core represented only a small portion of the total area of the said end faces most of whose area was taken up by the cross-sectional area of the fibre cladding. To achieve efficient coupling of the excitation light into the fibre laser bundle end face of prior art fibre bundle based, phased-array lasers would have required the use of complex and expensive arrays of micro-lenses, each one positioned so as to focus its portion of the excitation light into its own matching fibre core. Prior art phased-array lasers also suffered from multilobbed output beams, and, in the case of such prior art phased-array lasers formed by stacking together semi-conductor laser diodes, from severe heating of the output aperture due to the fact that over 60% of their electrical energy input was deposited within the body of the array itself.

This invention overcomes the defects and operating problems of prior art fibre bundle based, phased-array lasers by using fibres whose core diameters are comparable to or greater than their cladding thickness, ideally, using optical fibres which contain a multitude of cores within a given cladding so that the core diameters are much greater than their separation from each other. In a preferred embodiment, the present invention uses multi-cored optical fibres doped with the appropriate lasing ion. This configuration allows for most of the laser light incident on the aperture face constructed from the optically polished ends of such fibres to pass into the fibre cores. For example, a well collimated beam of narrow optical bandwidth excitation light emitted from a stack of temperature tuned phase-locked laser diodes can be injected into the invention via its end face with high efficiency.

The invention also allows for the plane of polarization of the laser light propogating within said fibres to be magnetically rotated.

BACKGROUND OF THE INVENTION

Pioneering work on fibre bundle lasers was undertaken by the inventor at the Royal Radar Establishment, UK in 1963 when laser light was propogated through optical fibre bundles that were commercially available at that time. The early goal was to use bundles of coherently packed optical fibres to inter-connect laser rod media to a flexible membrane transmitting aperture of an early laser radar system. However, these experiments showed the complete unsuitability of early optical fibre bundles for the transmission of laser light. With the advent of single mode optical fibres during the 1970's, the situation was reconsidered and some details were published in 1979 (Hughes and Ghatak Applied Optics, USA Vol. 18, No. 13, 2098, issued July 1979) with the key elements being classified by the US and UK patent offices in 1984. The first commercially orientated invention that originated from this pioneering effort to develop phased-array, fibre bundle based lasers was described in a patent format (Hughes, U.S. Pat. No. 4,682,335 issued Jul. 21, 1987).

This invention covers an important aspect of the development of phased-locked fibre laser bundles in that it provides for the switching of a looped fibre laser bundle laser oscillator via the modularisation of the excitation light entering via the end face of a laser oscillator system which can be side excited to lasing threshold. In the case when the invention is used as a laser pulse amplifier, its end faced pulsed excitation can be of a travelling wave format to avoid selfoscillation of the said amplifier, a process which leads to the depletion of the stored energy with the excited amplifier prior to the passage of the laser pulse to be amplified.

The invention is essentially a glass laser in which the severe operating problems experienced with solid rod and slab glass laser media are avoided. Firstly, the low thermal conductivity of glass is overcome by using very thin glass fibres which can be easily cooled and also by using glass fibres in relatively long lengths so that the heat loading over the total gain path can be minimised. Secondly, the self-focusing problems caused by the radiation induced self-collapse of the laser beam within a laser medium is avoided because the thickness of the fibre core is comparable to the wavelength of the laser light undergoing amplification.

When used as an amplifier, the invention can be placed wholly or partly in a magnetic field which allows for the rotation of the plane of polarization of the laser light propogating through the fibre cores via the Faraday effect. Since the Faraday rotation effect is always in the same direction, it is an effective technique for rotating the plane of polarization in the present invention. Such a rotation of the plane of polarization of the input laser beam allows for a series of amplifier configurations of the invention to be optically coupled to form an amplifier chain. Both the oscillator and amplifier configurations of the invention are scaleable to high continuous and mean power levels respectively.

OBJECTS OF THE INVENTION

It is an object of the invention to provide a means of optically exciting a looped fibre bundle laser via its end face. It is also an object of the invention to provide a looped fibre laser bundle oscillator which can be optically switched via the pulsed excitation light incident on the end face.

Another object of the invention is to achieve lasing threshold via the side excitation of the fibre lasers forming said fibre bundle body of said invention.

Another object of the invention is to provide a laser structure which minimises the thermal loadings per unit area/volume.

Yet another object of the invention is to provide a laser medium configuration which minimises the chances of self-focusing occurring within the laser gain medium.

It is an object of the invention to provide fibre laser cores whose diameter exceeds their separation, whilst being protected by the mutual strength of the cladding medium.

It is also an object of the invention to provide magnetic field means which allows for the rotation of the plane of polarization of the porpogating laser light.

The invention can be side excited with the optical output of diode laser arrays to its operating threshold then rapidly pulsed above threshold via the optical output of diode laser arrays via its output aperture at high repetition rates into the gigahertz ($10^{10}$–$10^{12}$ pulses per second) range. The invention may be scaled to high power levels simply by adding more fibre lasers to the original bundle of fibre lasers and exciting them accordingly. By increasing the laser beam intensities in a particular fibre laser core, it is possible to exceed the threshold of non-linear optical effects to frequency tune the invention.

The length of the individual fibre laser loops need not be identical to ensure the phasedlocked operation of the output aperture of the invention as a whole. The phase locking of the output aperture will be achieved provided that the length of a particular fibre loop is much greater than the wavelength of the laser output beam. This will generally be the case in practice with the length of the fibre loops being several meters and the wavelength of the laser light being $10^{-4}$ cms. By index matching the output mirror, optically polished to a tenth wave or better, the optical path length from the said mirror via the index matching medium, along any fibre loop and back to the mirror surface will be the same, to an accuracy of a wavelength or better as far as phase changes along any looped path is concerned. Added to these conditions, the doped glass fibres of the invention have a relatively broad gain curve so that a wide range of wavelengths, around the peak wavelength, can be maintained. This situation allows a supermode wavelength to dominate despite the fact that it will not be identical to the peak wavelengths, that is the laser wavelength corresponding to the peak of the gain curve of the fibre laser medium. It should also be noted that the supermode does not have to be maintain along the total length of fibre in the invention which would amount to may kilometers per $cm^{-2}$ of cross-section, but only over the length of individual loops of said laser fibres, that is over several meters at a time.

BRIEF DESCRIPTION OF THE DRAWINGS

A better understanding of the invention will be obtained from the following considerations taken in conjunction with the drawings which are not meant to limit the scope of the invention in any way.

DETAILED DESCRIPTION OF THE INVENTION

Figure 1:
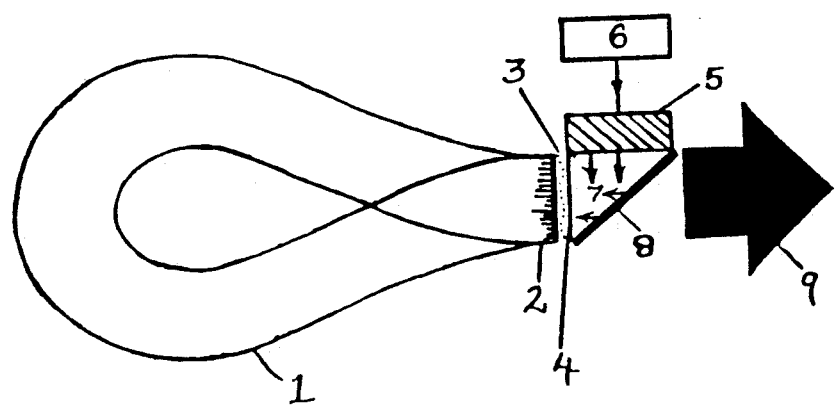
FIG. 1 shows a schematic layout of the invention in an oscillator configuration, the looped fibre laser bundle being end excited using the output of a laser diode array.

In FIG. 1, numeral 1 indicates a looped bundle of laser ion doped, single mode optical fibres whose core diameter exceeds their separation. Numeral 2 indicates the optically polished ends of the looped fibre lasers stacked together to form the single output aperture of the invention. Numeral 3 indicates an index matching medium which balances the optical path lengths from the optically polished mirror indicated by numeral 4 through any of the said fibre laser loops and back to mirror 4 which could contain a light activated dye to Q-switch the invention in the laser oscillator configuration.

In FIG. 1, numeral 5 indicates a light emitting diode array which directs narrow optical bandwidth light into fibre laser bundle 1 via aperture 2 which matches the optical absorption bands of the laseing ions doped into the cores of the fibre lasers in bundle 1. The power supply used to energise diode array 5 is indicated by numeral 6 whilst numeral 7 indicates the optical output of array 5 which is reflected off the angled reflector indicated by numeral 8 which in turn is transparent to the laser beam wavelength, allowing the emission of the phased locked output beam from the invention, indicated by numeral 9.

Figure 2:
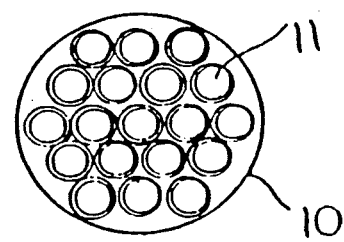
FIG. 2 shows a bundle of thin walled optical fibres whose cores represent most of the cross-sectional area of said fibre bundles.

In FIG. 2, numeral 10 indicates a cross-section of fibre laser bundle 1 where the laser fibre cores indicated by numeral 11 each have a diameter exceeding the thickness of its cladding.

Figure 3:
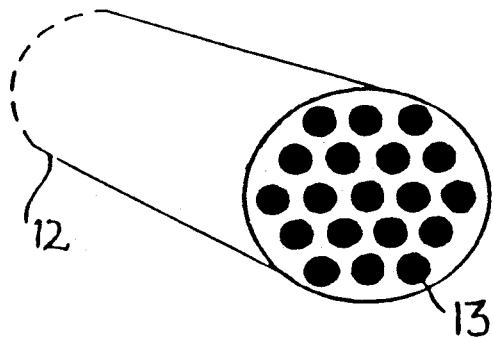
FIG. 3 shows the cross-section of a fibre within the looped fibre laser bundle with the multiple/cores representing most of the cross-sectional area of said fibre.

In FIG. 3, numeral 12 indicates a multicored optical fibre where the cores, indicated by numeral 13 are embedded in a common cladding 12, each core 13 having a diameter which exceeds their separation within common cladding 12.

Figure 4:
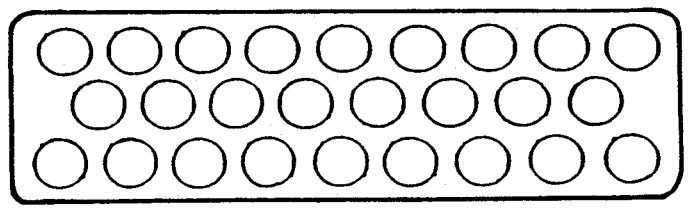
FIG. 4 shows the rectangular cross-section of a stack of optical fibres which can form a basic building block for the looped fibre bundle of the invention.

In FIG. 4, numeral 14 indicates a fibre bundle of rectangular cross-section with fibre cores indicated by numeral 15 having a diameter which exceeds their separation. The rectangular cross-section 14 allows for close packed scaling of such fibre modules.

Figure 5:
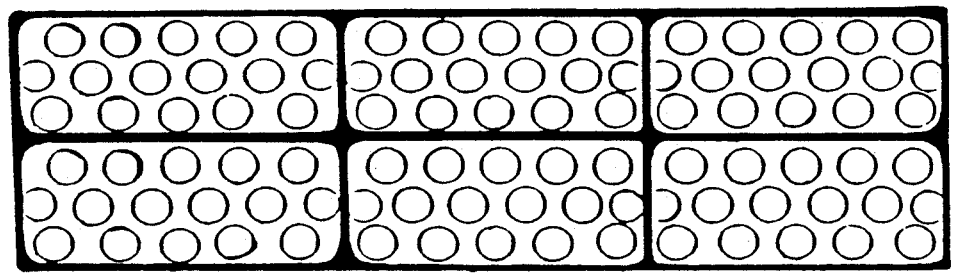
FIG. 5 shows stacks of the basic building block shown in FIG. 4 all of which have phased locked outputs which in turn are phased-locked as a whole.

In FIG. 5, numeral 16 indicates a stacked fibre bundle formed from units 14. Each unit 14 can be phased-locked to emit a coherent laser beam and a stack of such units 14 can have their output beams phased locked in turn so that the final output beam 9 can be formed of groups of phased locked laser beams.

Figure 6:
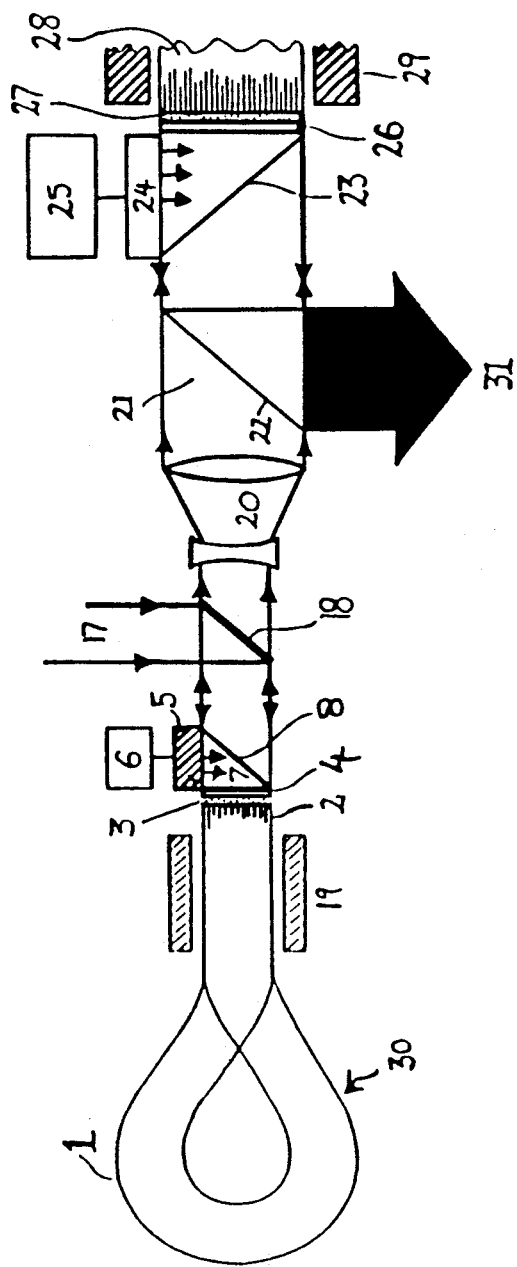
FIG. 6 shows an amplifier chain configuration incorporating units of the invention. Faraday rotations turn the plane of polarization of the laser beams within the fibre lasers forming said bundles through 90° thus allowing for the transmission of the output beams through their respective polarized beam reflectors.

FIG. 6 shows a series of the modules of the invention assembled into an amplifier chain with each unit being of a larger cross-section than its predessor in the said chain.

In FIG. 6, numeral 17 indicates the laser input beam to be amplified whilst numeral 18 indicates an angled reflector mirrored to reflect a given polarization state of the incident laser beam into bundle 1 via aperture 2. Numeral 19 indicates a magnetic field which allows for the rotation of the plane of polarization of the laser beam to be amplified within each fibre by an amount of 45° per passage ensuring that a 90° polarization shift has occured between the input and output beams which allows the latter to be transmitted by reflector 18. Numeral 20 indicates a laser beam expanding telescope which generates the expanded laser beam 21 to match the diameter of the next amplifier module, firstly passing through the polarized beam splitter indicated by numeral 22 and also the polarized beam splitter indicated by numeral 23 which also reflects excitation light 7 from the diode array indicated by numeral 24 driven by the power supply indicated by numeral 25. Numeral 26 indicates an anti-reflection coated window index-matched via the medium indicated by numeral 27 to the enlarged fibre laser amplifier bundle indicated by numeral 28. Numeral 29 indicates the magnetic field used to rotate the plane of polarization of laser beam 21. Numeral 30 indicates the excitation light directed sideways into the amplifiers of the invention to bring the fibre lasers up to operating threshold whilst numeral 31 indicates the amplified output of amplifier 28 being directed into the next amplifier within the chain.

The invention has application for the generation and amplification of both continuous wave and pulsed laser beams which can be scaled to high power levels using a single module or a series of modules. The invention has applications in the Industrial, medical and defence fields whenever powerful, high quality laser beams are required.

The present invention is scalable to practically any dimension because the conditions necessary for phase-locking over a small area of the output aperture are identical to those required to phase-lock over a very large area of output aperture.

The invention is efficient because the excitation light enters through the single aperture with high coupling efficiency and is highly absorbed in the doped fibres before it can emerge again.

The invention can operate either in a continuous wave output mode or pulsed mode at high repetition rates.

It should be noted that at high laser beam intensities within the individual fibres of the invention, non-linear optical processes can occur which lead to the generation of laser outputs at different wavelengths depending on the level of excitation of the invention above the non-linear thresholds and the coating on the output aperture face 2 at the required wavelength with fully reflecting mirrors at the fundamental lasing wavelength.

In the tuneable format, the invention has application in the separation of isotopes via their selective excitation in the vapour phases.

Modifications may be made within the above described subject matter without departing from the spirit and scope of the invention.

I claim:

1. An end excited, single mirror, single mode, looped laser fibre bundle based laser oscillator system comprising:

a scaleable bundle of looped, single mode laser fibres with the length of the individual fibre loops being many orders of magnitude greater than the wavelength of the laser beam output, the optically polished ends of said fibre loops being positioned together to form a single plane aperture which is index matched to a single, partially transmitting output mirror, the phase locking process involving the optical paths from said mirror, through any particular loop of any particular length, being identical to a fraction of the laser wavelength required for good phase locking to occur, a narrow optical bandwidth optical excitation source whose output wavelength matches the absorption bands of the laser fibres forming said fibre bundle, said optical source being composed of an array of semi-conductor diodes connected to an electrical power supply and whose optical output beam is directed, via an angled reflector, mirrored at the excitation wavelength but not at the lasing wavelength and positioned relative to the output face of the fibre bundle laser such that an excitation light can be directed into said bundle via its single end face in such a manner that allows the phased-locked laser beam output to pass through said reflector, said optical fibres forming the looped fibre bundle having their core diameters greater than their cladding, thus providing an output aperture whose area is composed mainly of fibre core faces allowing for efficient excitation of said looped laser fibre bundle through said aperture using the emission of laser diode arrays.

2. A system as claimed in claim 1 where the individual fibre lasers have multiple cores whose diameters exceed their separation.

3. A laser system as claimed in claim 1 where the fibre laser bundle is composed of a series of smaller bundles, each one of which emits a phased-locked laser beam such that the output aperture as a whole emits a phased-locked, single beam.

4. A laser system as claimed in claim 1 where the excitation light source is a phased-locked array of laser diodes.

5. A laser system as claimed in claim 1 where the fibre laser bundle is side excited optically to attain lasing threshold.

6. A laser system according to claim 1, wherein said optical fibres are doped with rare earth ions.

7. An end excited, looped fibre laser bundle laser amplifier system comprising:

a scaleable bundle of fibre lasers whose cores have a diameter greater than their separation, the length of each looped fibre being many orders of magnitudes greater than the wavelength of the laser beam output, the optically polished ends of said looped fibre lasers being stacked together to form a single aperture which is index-matched to a single, highly transmitting, optically polished window whose output face is anti-reflection coated at both the laser and excitation light wavelengths, a narrow optical bandwidth, optical excitation source whose output wavelengths match the absorption bands of the fibre lasers forming said amplifier fibre bundle, said optical source being composed of an array of semi-conductor diodes connected to a switchable electrical power supply and whose optical output beam is directed, via an angled reflector mirrored at the excitation light wavelength, but not at the laser wavelength and positioned relative to the output face of the fibre bundle laser such that excitation light can be directed into said bundle via its single face in such a manner that allows the phased-locked laser beam output to pass through said reflector, a magnetic field generating coil which is placed over the input end of said amplifier to rotate the plane of polarization of said propogating laser beams through an angle of 90°, optical sources positioned around said fibre bundle body of said amplifier to excite it to its lasing threshold.

8. A laser system according to claim 7, wherein said optical fibres are doped with rare earth ions.

9. Amplifier chain comprising:

a plurality of end excited, looped laser fibre laser bundle based laser amplifier modules having a scaleable bundle of laser fibres, said laser fibres having core diameters greater than their separation, each looped fibre having a length many orders of magnitude greater than a wavelength of a laser beam output, optically polished ends of said looped fibre lasers stacked together to form a single highly transmitting optically polished window, said window having an output face anti-reflection coated at both the laser and excitation light wavelengths, a magnetic field generating coil disposed over an input end of said amplifier module to rotate a plane of polorization of propagating laser beams through an angle of 90°;

and a narrow optical bandwidth optical excitation source having wavelengths matching absorption bands of said laser fibres, said optical source being composed of an array of semi-conductor diodes connected to a switchable electric power supply, an output beam, an angled reflector mirror positioned relative to an output face of said bundle of laser fibres to direct said output beam, at an excitation light wavelength, but not at a laser wavelength, into said bundle, and to allow said laser beam output to pass through said reflector mirror, a plurality of said optical sources being disposed around said fibre bundle body of said amplifier module to excite it to its lasing threshold, wherein said modules are arranged in a series, connected by the beam expanding telescopes and including polarized laser beam reflectors to direct the amplified laser beam from one module in the chain to another module of increasing cross-sectional area.

* * * * *